United States Patent [19]

Manning

[11] 4,433,506
[45] Feb. 28, 1984

[54] COMBINED VENT AND ESCAPE HATCH

[75] Inventor: Donald L. Manning, Orchard Lake, Mich.

[73] Assignee: Transpec, Inc., Troy, Mich.

[21] Appl. No.: 377,514

[22] Filed: May 12, 1982

[51] Int. Cl.³ .............................................. E05B 65/10
[52] U.S. Cl. ................................ 49/141; 292/DIG. 65
[58] Field of Search .................. 49/141, 465; 296/218, 296/224; 292/DIG. 65, 227

[56] References Cited

U.S. PATENT DOCUMENTS

| 289,666 | 12/1883 | Lee ................................. 292/227 UX |
| 3,936,086 | 2/1976 | Berkowitz .............. 292/DIG. 65 X |
| 4,021,073 | 5/1977 | Manning ........................... 49/141 X |
| 4,283,885 | 8/1981 | Remick et al. .................. 49/141 X |

Primary Examiner—Philip C. Kannan

[57] ABSTRACT

A lid for a vehicle roof opening has linkage hinging it to the roof structure accommodating tilting the lid upwardly in either of two directions, or elevating it bodily, for use of the opening to ventilate the vehicle, including provision for manually actuatable means both internal and external of the vehicle for separating parts of the hinging linkage to permit swinging the lid fully open for use of the roof opening as an escape hatch. In a modification, the lid is hinged for tilting in only one direction to a ventilating position or swinging to the full open position in the same direction.

8 Claims, 9 Drawing Figures

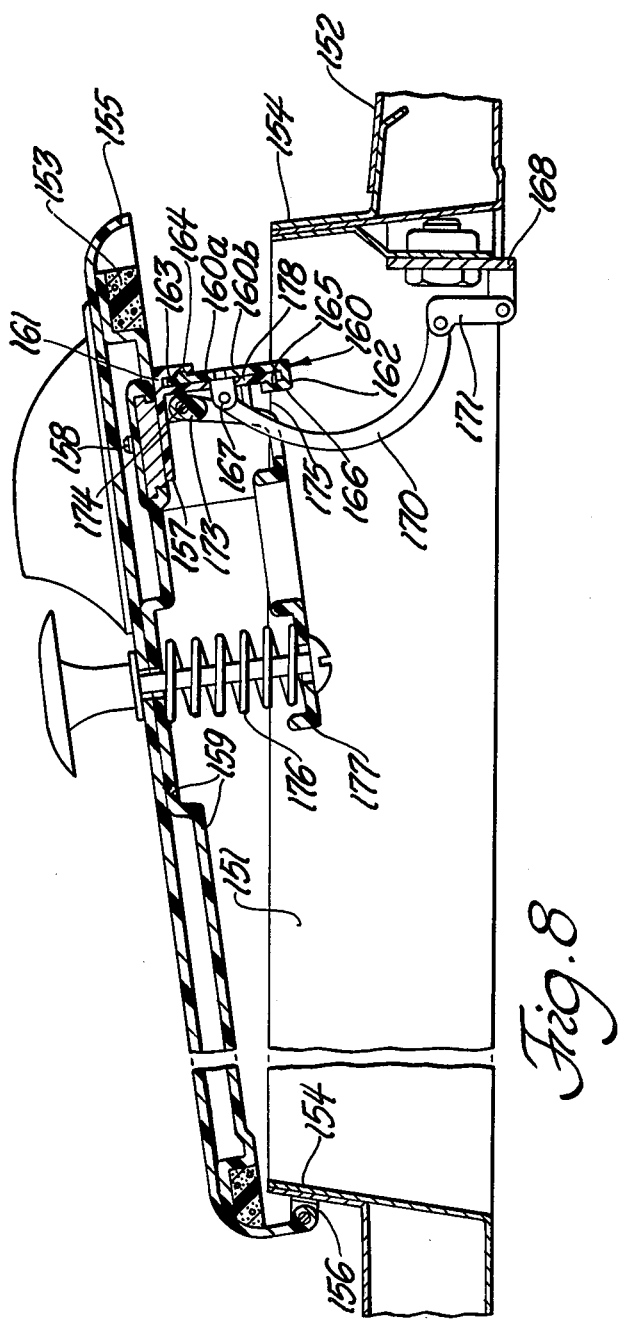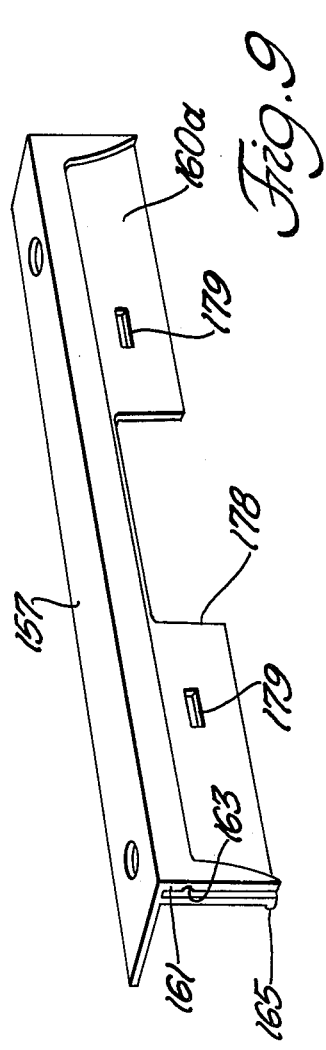

COMBINED VENT AND ESCAPE HATCH

TECHNICAL FIELD

My invention is an improvement over the device shown in my earlier U.S. Pat. No. 4,021,073 issued May, 3, 1977 and relates to roof ventilators for closed vehicles such as buses, trailers, trucks and railway cars, and particularly to an improved closure or lid by which the ventilator opening in the roof of such a vehicle may also serve as an escape hatch for occupants in the vehicle in the event of an accident or other emergency rendering the normal means of egress unusable.

In its more specific aspects my invention provides a lid which in normal operation either closes the roof opening or is raised to a partially elevated position when ventilation of the vehicle so requires, and which can be manually released and forced upwardly either from within or exteriorly of the vehicle to swing the lid to fully open in the event of an emergency requiring use of the roof opening as an escape hatch.

BACKGROUND ART

I am aware that roof ventilators employing a lid which can be tilted upwardly are well known in the art with the nearest teachings being my own earlier U.S. Pat. No. 4,021,073 and the prior art referred to therein.

DISCLOSURE OF THE INVENTION

My earlier patent discloses a two-way tiltable and vertically raisable roof vent lid whose alternative positions are made possible by two hinging mechanisms each employing two sets of toggle-type linkages, one of the hinge brackets comprising two separable web-forming parts which can be forced apart by manual upward force applied to the underside of the lid, allowing the lid to be swung fully open for use of the roof opening as an escape hatch. In the case of a roof vent lid which is tiltable upwardly about a single hinge axis to its venting position, a generally similar bracket with separable web-section parts is employed for connecting the tilt actuating mechanism to the lid. In each embodiment a release lever is preferably added which is pivotally connected to the underside of the lid so that when pushed upwardly toward or into abutment with the lid in the course of applying upward force to separate the bracket web sections, a projection normally engaging aligned holes in the web sections is withdrawn to release them for separation.

The improvement in the present invention is the provision of a release member located exteriorly of the vehicle whereby the lid or hatch may be opened by a person outside of the vehicle to provide an escape hatch for passengers within the vehicle. Thus, the mechanism of this invention addresses and overcomes the problem of opening an emergency escape hatch from outside the vehicle under conditions when entrapped passengers are unable to do so.

The advantage of the present invention is that the exteriorly actuated release device coacts simply with my earlier disclosed internally located lid release mechanism.

The advantages of my invention will be more clearly understood and appreciated from the following description of two embodiments thereof selected to best illustrate the principles involved and preferred means for carrying out the same, having reference to the drawings wherein:

BRIEF DESCRIPTION OF DRAWINGS

FIG. 8 is a view similar to FIG. 7 but with the lid tilted to its partially open or ventilating position; and FIG. 9 is a detail view in perspective of the upper of the two separable bracket parts shown in FIGS. 7 and 8.

BEST MODE FOR CARRYING OUT THE INVENTION

Figure 1:
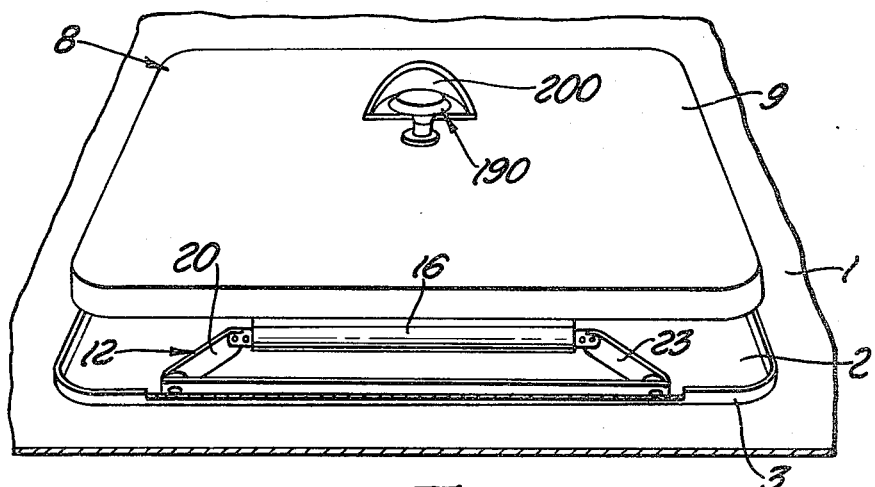
FIG. 1 is a perspective view of a portion of a vehicle roof with an opening therein and a lid therefor constructed in accordance with the invention and shown in partially open or ventilating position.
Figure 2:
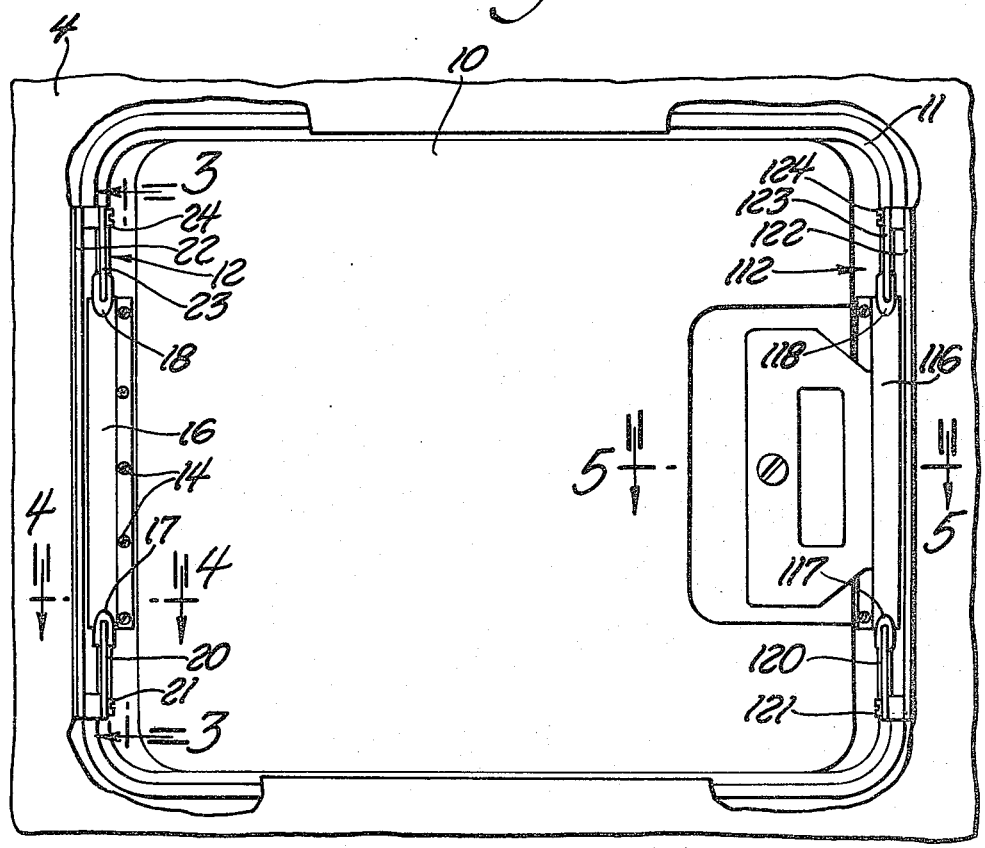
FIG. 2 is a bottom view of the roof opening and lid shown in FIG. 1 but with the lid in closed position.
Figure 3:
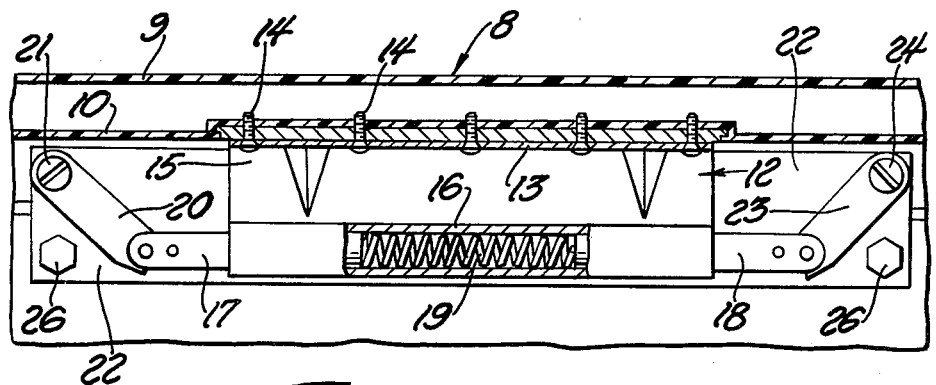
FIG. 3 is an enlarged fragmentary view taken in the direction of arrows 3—3 of FIG. 2 showing one of the hinging mechanisms, certain parts being broken away and in section.
Figure 4:
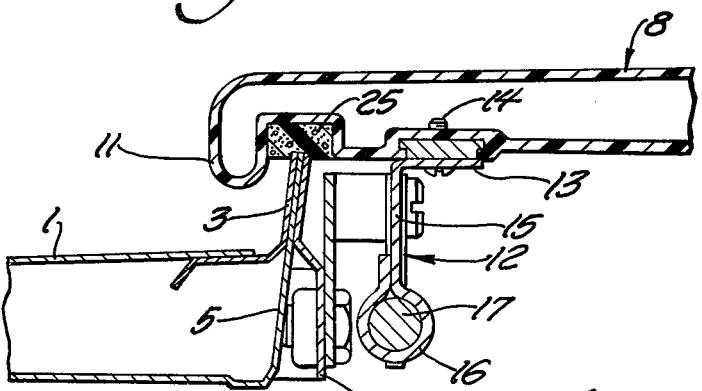
FIG. 4 is an enlarged fragmentary sectional view taken substantially on line 4—4 of FIG. 2.

Referring now in detail to the drawings, and first to FIGS. 1–6, a vehicle roof structure is shown as including an outer upwardly facing panel 1 having a generally rectangular opening 2 therein which, in accordance with the invention, may alternatively be used either for ventilating the interior of the vehicle or as an escape hatch. Also included in the roof structure, as best seen in certain of FIGS. 1, 4–6, is an upwardly directed flange 3 which extends around the periphery of the roof opening, an inner roof panel 4 and reinforcement members 5 and 6. Serving as a cover for the opening 2 is a lid 8 shown formed of integrally joined upper and lower panels 9 and 10 whose lateral extremities overhang the roof opening flange 3 and are flanged downwardly in spaced relation therearound as at 11. Mounted to the underside of the lid 8 so as to extend into the roof opening 2 adjacent one side thereof is a first hinging means designated generally by the numeral 12. This hinging means 12 includes a bracket comprising a flange 13 underlying and secured to the lower panel 10 of the lid by screws 14, and a depending web section 15. Extending longitudinally with and secured to the lower extremities of the web section, as by forming it integrally therewith, is a cylindrical sleeve section 16 which rotatably and slidably supports two plungers 17, 18. Within the sleeve section and biasing the plungers apart therein is a coil compression spring 19. Pivotally connected to the outward end of plunger 17 is one end of a swinging link 20 whose other end is pivotally connected, as by a pin 21, to a support bracket 22. Similarly, the outward end of plunger 18 is pivotally connected to one end of swinging link 23 whose opposite end is pivotally connected by a pin 24 to the same supporting bracket 22. The axes for swinging movement of the links 20 and 23, as defined by the pins 21, 24, extend transversely of the bracket 12 and are spaced from each other on the supporting bracket 22 so that, by forcibly elevating the bracket 12 relative to the supporting bracket 22, either or both of the links 20, 23 may be swung into longitudinal alignment with their respective plungers 17, 18, additionally compressing the spring 19. When released, the compressive force of the spring, acting outwardly against the plungers causes each link 20, 23 to swing either clockwise or counterclockwise (dependent upon whether its pivotal connection to its plunger is above or below the longitudinal axis of the sleeve section 16). Thus, an over-center toggle linkage relationship between each plunger 17, 18 and its link 20, 23 is provided which acts either to bias the lid downwardly to its closed position shown in FIGS. 3 and 4, or upwardly to a limited open position in which one or both of the links 20, 23 are inclined upwardly from their pivot pins 21, 24. When the lid is in its closed position shown in FIGS. 3 and 4, the opening in the roof is sealed by abutment of the gasket material 25 on the underside of the lid with the roof opening flange 3.

In like manner, a second hinging means 112 is mounted to the underside of the lid so as to extend into the roof opening 2 adjacent the opposite side thereof from the hinging means 12. This second hinging means 112 (FIGS. 5 and 6) likewise includes a bracket comprising a flange 113 underlying and secured to the lower panel 10 of the lid by screws 114, and a depending web section 115 having a cylindrical sleeve section 116 formed integrally with its lower extremities. Within this sleeve section 116 are two plungers 117, 118 (see FIG. 2), identical to the plungers 17, 18, and a compression spring (not shown, but identical to spring 19) between the plungers 117, 118 and biasing them outwardly of the sleeve section 116. Also in identical manner to the first hinging means 12, the plungers 117, 118 are pivotally connected to links 120, 123 whose opposite ends are pivotally connected by pins 121, 124 to a second supporting bracket 122, the spacing of the pins 121, 124 from each other being the same as that of pins 21, 24. Each of the supporting brackets 22 and 122 is adapted for mounting to the roof supporting structure, inwardly of and adjacent its respective side of the roof opening 2, as by bolts 26 and 126, respectively.

Because of their parallel relationship and identical linkage geometry, the two hinging means 12 and 112, which I do not claim to have invented per se, cooperate in either holding the lid fully closed against the flange 3 surrounding the opening 2 in the roof, or positioning the lid in any one of three partially open positions. Thus, starting with the lid in its fully closed position, it may be tilted upwardly about its side intermediate the link pivot pins 24 and 124 by manually applying sufficient upward force to the underside of the lid in the area thereof intermediate the link pivot pins 21 and 121 to cause the links 20 and 120 to swing upwardly about their pivot pins 21, 121, forcing their plungers inwardly against the biasing force of the springs in their bracket sleeve sections 16, 116, until the plunger connected ends of the links 20, 120 pass "over-center", i.e. the longitudinal axes of the sleeve sections extend above the pivot pins 21, 121. Similarly from a fully closed position, the lid may be tilted upwardly about its side intermediate the link pivot pins 21 and 121 by applying upward manual pressure to the area of the lid between the link pivot pins 24, 124 to cause the links 23, 123 to swing upwardly about their pivot pins 24, 124, to a like "over-center" position. Also with the lid tilted upwardly in either direction as described, it may also be additionally tilted in the opposite direction by manual application of upward force thereto in the area adjacent that side of the lid about which it had previously been tilted, thereby completing a bodily upward movement of the lid to the position shown in FIG. 1, wherein it accommodates "throughflow" ventilation of the interior of the vehicle. The links, by reason of their pivotal connections with their respective plungers and pivot pins in the supporting brackets 22 and 122, also serve to limit the opening movement of the lid. Also, the lid will remain in whichever partially open position it is placed, pending application of manual force to effect compression of the springs opposing the return of the links to their original positions.

Figure 5:
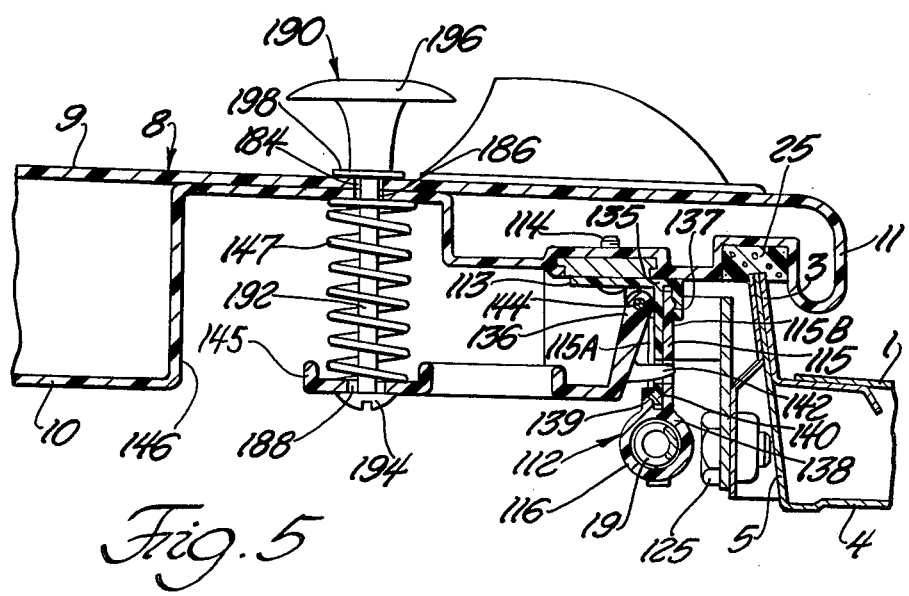
FIG. 5 is an enlarged fragmentary sectional view taken substantially on line 5—5 of FIG. 2.
Figure 6:
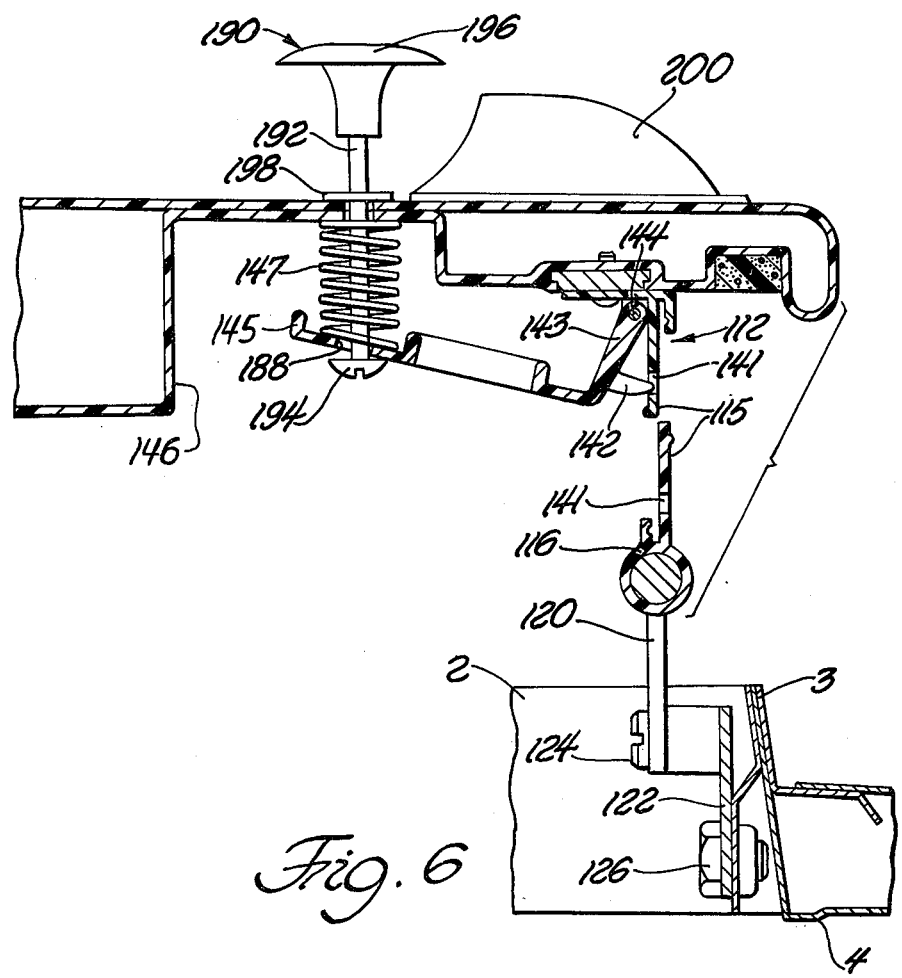
FIG. 6 is a view similar to FIG. 5 but with certain parts disengaged, enabling the lid to be swung to its fully open position for converting the roof ventilating opening to an escape hatch.

The means by which the lid may be fully opened to its escape hatch position will now be described. As best shown in FIGS. 5 and 6, the bracket portion of hinging means 112 which is connected to the lid is comprised of two separable members. One of these members is made up of the lid attaching flange 113 and a part 115A of the bracket web section 115, and the other consists of the sleeve section 116 and a part 115B of the web section 115. In their normal, initially assembled relation the two web section parts lie adjacent each other as shown in FIG. 5. Part 115A has a U-shaped upper portion 135 closely embracing the upper portion of web section part 115B, and one inner face of U-shaped portion 135 is provided with a groove 136 into which a ridge 137 on part 115B projects to further their mutual retention to each other. Similarly, part 115B has a U-shaped lower portion 138 closely embracing the lower portion of web section part 115A, and one inner face of U-shaped portion 138 is provided with a groove 139 receiving a projecting ridge 140 on part 115A. Preferably these parts 112, 115A, 115B and 116 are made of deformable but relatively stiff plastic material, such as "Nylon", or "Nylon" filled "Fiberglass", so as to resist vertical disengagement of the two web section parts 115A and 115B under forces applied upwardly against the lid of less than 60 pounds.

To further ensure against unintentional separation of the web section parts 115A and 115B, each is provided with one or more apertures 141 (FIG. 6). In the normal assembled condition of the parts these apertures are in aligned relation as between the parts 115A and 115B for reception of a retainer in the form of a projection 142 on a lever 143. The lever 143 is pivotally connected to the lid 8 by a pin 144 mounted in a boss depending from the flange 113, and has an operating arm 145 disposed opposite a recess 146 provided therefore in the lower panel 10 of the lid. A compression spring 147 interposed between the operating arm 145 and the recessed portion of the lid panel biases the lever to its normal position shown in FIG. 5, wherein the projection 142 is engaged with the aligned apertures in parts 115A and 115B.

In the event of an emergency requiring use of the roof opening 2 as an escape hatch, the lid may be swung to a fully open position by application of manual force on the order of 60 pounds against the operating arm 145 of the lever in the direction toward the lid. Such force will act to pivot the lever in a clockwise direction about the pivot pin 144 from the position shown in FIG. 5 to the position shown in FIG. 6, causing the spring 147 to compress, the lever projection 142 to move out of engagement with the apertures 141 in the web section parts 115A and 115B, and the handle of the lever to move into abutment with the underside of the lid lower panel 10. With the lever projection 143 thus disengaged from the apertures 141 and the handle 145 in abutment with the lid, such force is then effective in an upward direction against the lid, causing that side of the lid to swing upwardly. This upward swinging movement of the lid is accommodated by the sleeve section 16 rotating about its plungers 20, 23 in the manner of a hinge. If this emergency action is initiated with the lid in its fully closed position over the roof opening, the sleeve section 116 can move upwardly a limited extent with the lid as the result of the links 120, 123 swinging upwardly about their pivot pints 121, 124 (to positions equivalent to those of links 20 and 23 in FIG. 1), but with continued upward swinging movement of the lid, the tensile stress on the two-part web section 115 increases sufficiently to cause the part 115A thereof to separate from part 115B, freeing the lid to swing fully open, i.e. counterclockwise as viewed in FIG. 4, to a position substantially perpendicular to the vehicle roof panel 1. In such position of the lid, the roof opening 2 may be used as an escape hatch for occupants within the vehicle.

Figure 7:
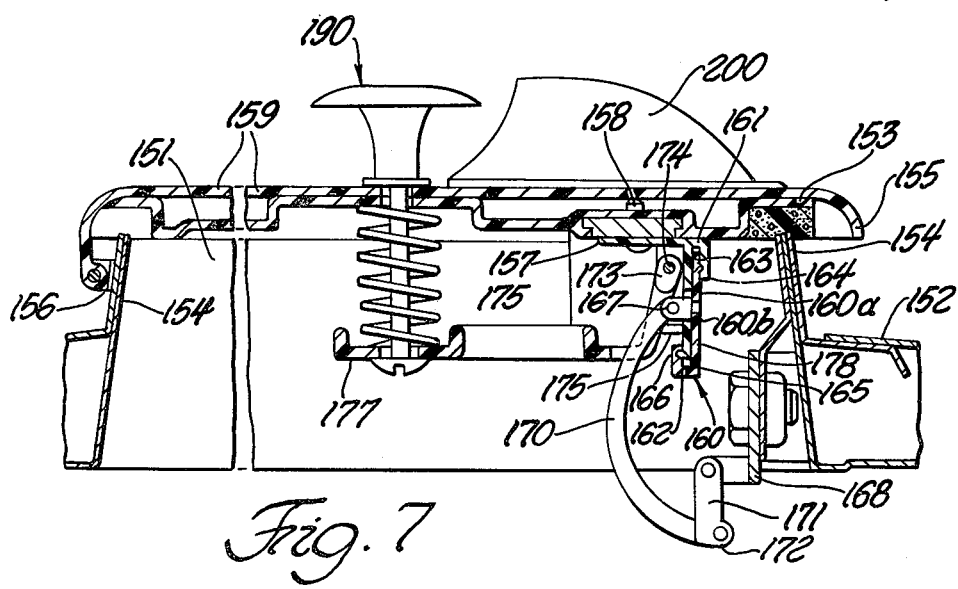
FIG. 7 is a transverse vertical sectional view of a modified form of the invention wherein the lid is openable to a ventilating position only by tilting it about a single hinge axis.

FIGS. 7–9 show a modification of my invention as applied to a simpler form of lid which is tiltable to a partially open or ventilating position about a single hinge axis. The lid 150, as in the previously described embodiment, is adapted to serve as a cover for an opening 151 in a vehicle roof 152. When in its fully closed position shown in FIG. 7, packing 153 on the underside of the lid seats against an upwardly presenting flange 154 which surrounds the roof opening. The lid is preferably flanged downwardly around its periphery as indicated at 155, and attached to this latter flange is a single piano-type hinge 156 which is adapted to be mounted as by bolting or welding (not shown) to the roof flange 154 at one side of the opening.

Secured to the lid so as to extend into the opening on the opposite side thereof from the hinge 156 is a bracket comprising a flange 157 underlying and secured, as by bolting 158, to an inner panel 159 of the lid, and a depending web section 160. This bracket is preferably made of deformable but relatively stiff plastic material such as "Nylon" or "Nylon" filled "Fiberglass", and the web section 160 consists of two parts 160A and 160B initially assembled in side-by-side relation. The upper portion of part 160A has a U-shaped section 161 closely embracing the upper portion of part 160B, and the lower portion of part 160B similarly has a U-shaped section 162 closely embracing the lower portion of part 160A. One inner face of the U-shaped section 161 has a groove 163 into which a ridge 164 projects from the upper portion of part 160B, and the lower portion of part 160A has a ridge 165 projecting into a groove 166 on an inner face of U-shaped section 162.

Pivotally connected at 167 to the web part 160B is one end of an over-center or toggle-type linkage whose lower end is pivotally connected to a supporting bracket 168, adapted for mounting to the supporting structure of the vehicle roof. This linkage, shown as comprising an upper bell crank 170 and lower link 171, hinged together at 162, serves both as means for manually actuating the lid between its closed position shown in FIG. 7 and a partially open or ventilating position shown in FIG. 8, and as the means for normally limiting such upward tilting of the lid.

As in the previously described embodiment of FIGS. 1–6, I also provide a lever 173 which is pivoted to the lid at 174 and has projections 175 normally engaging aligned apertures 179 in the two web section parts 160A and 160B. A spring 176 interposed between the handle portion 177 and the underside of the lid serves to normally maintain the lever in such position. The central portion of the web section part 160A has a recess 178 (see FIG. 9) to provide clearance for withdrawal of the bell crank 170 and its pivotal connection to the web section part 160B.

The lever 173 functions in the same manner as the lever 143 of the previously described embodiment upon application of upward manual force to the handle portion in the event of an emergency requiring actuation of the lid to a fully open position. Such a force, on the order of 60 pounds, causes the lever to pivot against the biasing force of the spring, withdrawing the lever projections 175 from engagement with the apertures 179 in the web section parts 160A and 160B. Thereafter, upon the lever handle portion moving into abutment with the lid, the lever connected side of the lid is forced upwardly, swinging about the axis of hinge 156, and effecting forcible separation of the web section parts 160A and 160B.

The means for actuating the internally located lid releasing levers 145 and 177 from outside the vehicle will now be described. Since such externally operated means is the same for the modifications of FIGS. 1–6 and 7–9, the same numerals will be used to describe the means as applied to each modification.

Referring particularly to FIG. 5, coaxially aligned holes 184, 186, and 188 are respectively formed through upper and lower lid panels 9 and 10 as well as through operating arm 145. Spring 147 is also coaxially related to such aligned holes. A release lever actuating handle is indicated generally at 190 and includes a rod 192 having an enlarged head portion 194. Rod 192 extends upwardly through holes 188, 186, and 184 so that head portion 194 abuttingly engages the lower surface of arm 145. A knob 196 is suitably attached, as by threading, to the upper end of rod 192 exteriorly of lid 8. An elastomeric sealing member 198 surrounds rod 192 and is disposed between knob 196 and upper lid panel 9 to prevent water leakage through holes 184 and 186. Lid holes 184 and 186 are only slightly larger than the diameter of rod 192 and, thus, support the rod in a generally vertical position. On the other hand, arm hole 188 is substantially larger than rod 192 to accommodate the pivotal movement of arm 145, as seen in FIG. 6, and thereby avoiding interference between the rod and arm.

To release lid 8 from outside the vehicle to completely open the lid for passenger escape purposes, knob 196 is grasped and lifted to the position shown in FIG. 6. In this manner projection 142 on lever 143 is disengaged from the apertures 141 in bracket parts 115A and 115B allowing such parts to be separated and lid 8 to be fully opened.

In order to protect handle 190 from being inadvertently opened or damaged should, for example, the vehicle engage a tree limb or other extraneous member such as a wire or rope, a deflector or shield 200 is provided. Shield 200 is preferably disposed longitudinally forwardly of handle 190 to protect handle 190 during the forward movement of the vehicle. Should it also be desired to protect handle 190 during backing movement of the vehicle, a second rearwardly disposed shield could also be provided.

It will be appreciated that various minor changes in the parts or their arrangement may be made without departing from the scope of the invention as hereinafter claimed.

What is claimed is:

1. In combination with a vehicle roof having an opening and an upwardly movable hinged lid therefor, means normally limiting upward movement of the lid to a tilted position accommodating use of the opening to vent the vehicle, said means comprising a lever pivotally connected at one end to the lid for upward movement of its other end toward the underside of the lid, a bracket comprising two parts normally extending in parallel side-by-side relation to each other adjacent one side of said opening, one of said parts being fixed to the lid, and a link pivotally securing the other of said bracket parts to the vehicle roof, each of said parts having an aperture normally aligned with the aperture in the other, said lever having a projection normally engaging the aperture in each said part but movable out of engagement therewith in response to pivotal movement of said lever other end toward the lid, said lever other end having a laterally extending portion for transmitting sufficient manual upward force to the lid to effect separation of said bracket parts following disengagement of said projection from said apertures, an opening formed through the lid and handle means extending through said lid opening and operatively connected to said lever whereby said lever may be actuated both internally and externally of the vehicle roof, a knob integrally formed on said handle means and disposed exteriorly of said lid.

2. The combination as set forth in claim 1 wherein an opening is formed in said lever in coaxial alignment with the lid opening, said handle means comprising a rod element slidably supported within the lid opening means, the knob integrally mounted on one end of said rod exteriorly of the lid, the other end of said rod being interconnected with said lever whereby lifting said knob away from said lid will cause said lever to pivot toward the underside of said lid.

3. The combination as set forth in claim 2 wherein the other end of said rod includes an enlarged portion abuttingly disposed underneath the laterally extending lever portion.

4. The combination as set forth in claim 2 wherein the lever hole means is substantially larger in diameter than said rod whereby the laterally extending portion of the lever may be inclined without interference by said rod.

5. In combination with a vehicle roof having an opening and an upwardly movable hinged lid therefor, means normally limiting upward movement of the lid to a tilted position accommodating use of the opening to vent the vehicle, said means comprising a lever pivotally connected at one end to the lid for upward movement of its other end toward the underside of the lid, a bracket comprising two parts normally extending in parallel sid-by-side relation to each other adjacent one side of said opening, one of said parts being fixed to the lid, and a link pivotally securing the other of said bracket parts to the vehicle roof, each of said parts having an aperture normally aligned with the aperture in the other, said lever having a projection normally engaging the aperture in each said part but movable out of engagement therewith in response to pivotal movement of said lever other end toward the lid, said lever other end having a laterally extending portion for transmitting sufficient manual upward force to the lid to effect separation of said bracket parts following disengagement of said projection from said apertures, spring means disposed between the laterally extending lever portion and the lid to pivot the lever projection into locking engagement with the bracket apertures, and handle means extending through said lid and operatively connected to said lever to allow said lever to be actuated both internally and externally of the vehicle roof, coaxially aligned opening means formed respectively through said lid and said lever, said handle means comprising a rod element slidably supported within the lid opening means and extending through said spring means, a knob integrally mounted on one end of said rod exteriorly of the lid, the other end of said rod being interconnected with said lever whereby lifting said knob away from said lid will cause said lever to pivot toward the underside of said lid.

6. The combination as set forth in claim 5 wherein said spring means biases said knot into abutting engagement with said lid.

7. The combination as set forth in claim 5 wherein the spring means is of a coil type and is coaxially disposed relative to said rod.

8. In combination with a vehicle roof having an opening and an upwardly movable hinged lid therefor, means normally limiting upward movement of the lid to a tilted position accommodating use of the opening to vent the vehicle, said means comprising a lever disposed interiorly of the vehicle and pivotally connected at one end to the lid for upward movement of its other end toward the underside of the lid, an over-center linkage means connected between said roof and said lid enabling the lid to be moved between a closed and partially opened ventilating position relative to said roof opening, the other end of said lever being movable toward the underside of said lid to disconnect the linkage means from said lid to permit said lid to totally uncover said roof opening, handle means extending through said lid and operatively connected to said lever whereby said lever may be actuated both internally and externally of the vehicle roof, and shield means mounted on the exterior of said lid and proximate to the handle means to prevent damage to or inadvertent actuation of said handle means.

* * * * *